Figure 1:
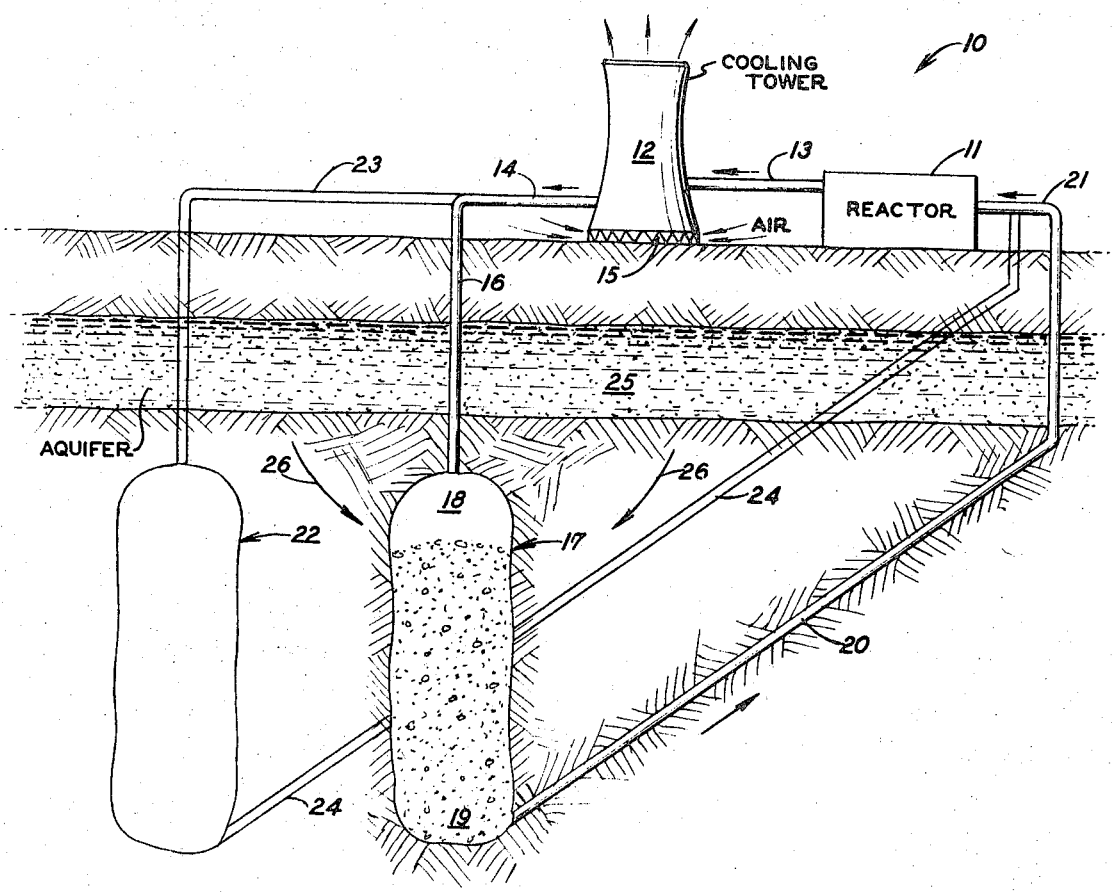

United States Patent [19]

Lahoud et al.

[11] 3,851,495
[45] Dec. 3, 1974

[54] METHOD AND APPARATUS FOR PREVENTING THERMAL POLLUTION

[75] Inventors: Joseph A. Lahoud; Dennis L. Orphal, both of Las Vegas, Nev.

[73] Assignee: Computer Sciences Corporation, Los Angeles, Calif.

[22] Filed: Oct. 5, 1971

[21] Appl. No.: 186,708

[52] U.S. Cl. .................................. 62/260, 165/45
[51] Int. Cl. ........................................ F25d 23/12
[58] Field of Search ............ 165/45; 62/260; 299/4, 299/5

[56] References Cited
UNITED STATES PATENTS

| | | | |
|---|---|---|---|
| 2,689,090 | 9/1954 | Wetherbee et al. | 165/45 |
| 3,348,883 | 10/1967 | Jacoby et al. | 299/4 |
| 3,392,530 | 7/1968 | Brandt | 61/0.5 |
| 3,589,773 | 6/1971 | Dixon | 299/4 |
| 3,658,123 | 4/1972 | Root | 165/45 |

OTHER PUBLICATIONS

J. R. Clark, Thermal Pollution and Aquatic Life, Scientific American, March 1969, 220(3) pp. 19–27.

*Primary Examiner*—Meyer Perlin
*Assistant Examiner*—Ronald C. Capossela
*Attorney, Agent, or Firm*—Jim Zegeer, Esq.

[57] ABSTRACT

Thermal pollution from industrial manufacturing and electric generation plants is avoided by incorporating in the water cooling system of such plants an underground water storage and heat dissipation space as formed by nuclear explosion. In a preferred embodiment, the system incorporates a wet type water cooling system (primarily because of its lower cost) and one or more nuclear chimneys below the level of the local aquifer or water table so that makeup water for water lost through evaporation in the wet type cooling unit is added by water draining or leaching to the nuclear chimney from the aquifer level.

9 Claims, 2 Drawing Figures

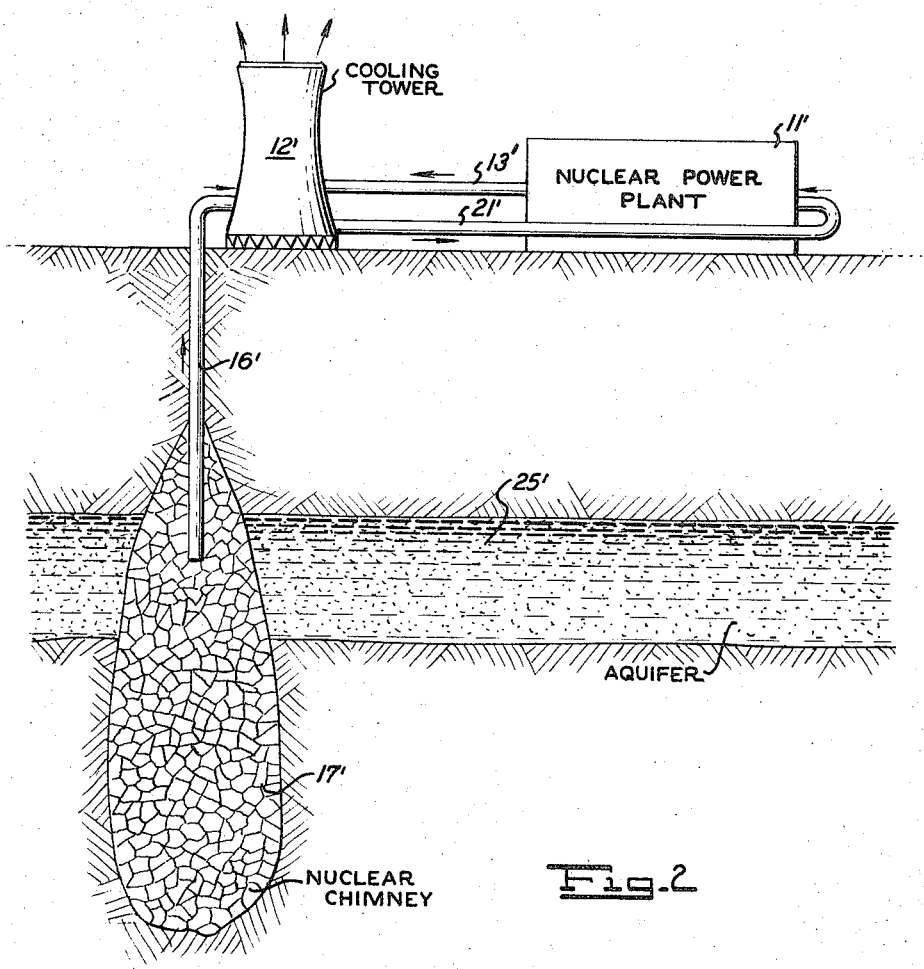

METHOD AND APPARATUS FOR PREVENTING THERMAL POLLUTION

The present invention is directed to the use of an underground water storage reservoir as a part of a water circulation system for industrial facilities such as to prevent thermal pollution of natural water.

The subject of thermal pollution of natural waters has been receiving increasing attention as evidenced by the establishment of provisional thermal pollution guidelines by the Federal Water Pollution Control Administration of the Department of the Interior and hearings conducted by the U.S. Senate Air and Water Pollution sub-committee. The extent of the problem as well as a number of prior art solution is shown in the following articles:

1. "Thermal Pollution and Aquatic Life" by John R. Clark appearing in Scientific American magazine March 1969, Volume 220, No. 3, pp. 19–27;
2. "Power Plants and Heat Pollution" by Richard H. Gulley, Science News magazine, Aug. 1, 1970, Vol. 98, No. 5, pp. 89–104;
3. "Burgeoning Atomic Plants Run Into Pollution Awareness" by Thomas O'Toole appearing in the Washington Post newspaper, Tuesday, Aug. 25, 1970.

As shown in these articles, the concern for thermal pollution arises from the estimate by the year 2,000 electric power production in the United States will reach about 2 million megawatts; about 1.2 million of which will be produced by nuclear power. This estimated electrical power production will require the dissipation of about 20 million BTU's of waste heat per day. To dissipate this waste heat through the flow of natural waters would require approximately one-third of the average daily freshwater runoff in the United States. The potential ecological hazard to aquatic life from dissipation of this waste heat through natural water fow is described in detail in the article from "Scientic American" (1) above.

Recognizing the present and potential ecological problems of thermal pollution, Federal legislation in the United States has been proposed which would require thermal pollution control features to be incorporated into the design of any proposed nuclear power plant before licensing for construction could be obtained.

The above referenced articles disclose many techniques have been proposed for safely dissipating the waste heat from a nuclear power plant or other industrial facility. Some of these techniques are discussed in detail in the above articles, particularly the articles from "Scientific American," and "Science News" including regulating the discharges into the natural waters, use of artificial lakes and use of cooling towers. All of these techniques have serious economical and/or environmental drawbacks. For instance, to dissipate the waste heat from a 1,000 megawatt nuclear power plant by use of an artificial lake would require a lake with a surface area of 1,000 2,000 acres with a depth up to 50 feet. In many areas, such a tract of land would be prohibitively expensive.

Underground reservoirs (natural and man-made including nuclear) have, obviously, been used in the past for gas as well as water storage. (For example, water storage purposes and/or management purposes, see U.S. Pat. No. 3,589,773.) In accordance with one embodiment of the present invention, waste heat from a nuclear electric power plant or other industrial facility is, at least, partially dissipated in the earth by using the chimney formed by an underground nuclear explosion as a large discharge water well and storage reservoir for dissipating heat into the earth interior and as a part of a substantially closed circuit cooling water system. In the accompanying drawings, such a system is disclosed as applied to a nuclear electric power generating station or facility.

One or more underground nuclear explosions can be detonated before plant construction (so that seismic data can be developed for and in design of the facility).

Such devices can be detonated in such a way that the chimney would be formed below the local water table or aquifer. Water used to cool the nuclear reactor is passed through a cooling unit and then discharged into the chimney region at the top portion thereof, and the cooler water removed from the bottom portion for reuse as described in detail hereinafter. Thus, using such a technique, a portion of the waste heat from the reactor would be slowly dissipated at a great depth in the earth and substantially all the water is reused and not discharged into the natural waters thus, the invention, in its preferred form, uses a nuclear explosion technology to aid in control of thermal pollution.

Thus this invention permits relatively extensive flexibility in the location of excess heat generating facilities. Siting is not dependent on streamflow or on proximity of large bodies of water. Underground sources or surface runoff in many geographical settings will be adequate for initial charging and periodic recharging of the nuclear explosion created underground reservoir.

The above and other objects, advantages and features of the invention will become apparent from the following description taken with the accompanying drawings wherein:

FIG. 1 is an embodiment of the invention as applied to a closed or substantially closed circuit cooling system and, FIG. 2 illustrates a modification of the invention.

Referring now to FIG. 1 of the drawing, the system is shown as applied to a nuclear electric power generating station 10 having a reactor 11 through which cooling water is caused to flow. Cooling water from reactor 11 is conveyed in a conventional manner to cooling tower 12 by way of a pipe system 13. Cool water from cooling tower 12 is discharged through pipe 14 to the underground storage reservoir system. Cooling air for the cooling tower enters the lower end of the cooling tower at 15 in a conventional manner and exits through the top, such cooling towers are typically of two broad categories namely the wet type and the dry type. A detailed disclosure of these types of cooling towers is found in the above-identified Scientific American article. Water discharged from the cooling tower 12 may be several degrees above the natural temperature of the natural water. Such an elevated temperature of water cannot be discharged directly into the local natural waters because of the problem of thermally polluting such waters and changing the ecological condition thereof. Accordingly, such water is caused to flow into a nuclear chimney or storage reservoir 17 by means of a pipe system 16. It will be noted that the water is introduced at the upper level 18 of nuclear chimney 17. Cooler water as it gravitates through the rubble and rocks and fissures in nuclear well or chimney 17 is tapped or removed from the lower level 19 thereof by means of a pipe system 20 which leads to the surface of the earth. Such cooled water is therefore recirculated through reactor 11 by means of pipe system 21. Thus, a substantially closed cycle system for cooling water is shown in this embodiment.

As described above, cooling tower 12 is typically of two types (see the Scientific American article). The first designated generally as a dry type provides for miles and miles of copper tubing through which the heated water is caused to flow. Cooling air enters (forced or by convection currents) at 15 in the bottom of such tower and exits from the top as shown. Cooled water from tower 12 is delivered to pipe 14 and enters the storage and cooling system constituted by nuclear chimney 17. Since dry type cooling towers do not use or lose much water such dry types can be used where there is no immediately available underground water table or use for one. In other words, where the water table or aquifer is not available or is of very low water yield and insufficient to supply the needed makeup water the dry type tower is preferred. However, in a most preferred form of the invention, the cooling tower 12 is of the "wet" type which means that it is significantly less expensive than the "dry" type. Moreover, in order to make up for lost water due to evaporation of water in cooling tower 12, the storage and cooling nuclear chimney 17 is located below the aquifer 25 so that water flows from the aquifer to chimney 17. This avoids heated water being carried to a possibly nearby stream by the flowing water in the aquifer.

Typically, the diameter of the chimney 17 may be 250 to 500 feet and 1,500 to 2,500 feet in height.

Moreover, when a nuclear explosion is used to form the chimney 17, observance of Nuclear Test Ban Treaty Safety Rules, of course, is mandatory so the detonation is set off at approximately 3,500 feet below the earth surface and such charge is typically less than a megaton charge. Details of the manner of forming such subterranean reservoirs of various sizes and configurations are well known in the art and by way of example attention is invited to U.S. Pat. No. 3,589,773.

As shown in FIG. 1, makeup water generally flows from the aquifer 25 down to the lower level of the chimney 17 as indicated by dotted arrows 26, it being understood that aquifer 25 may be connected or tapped by pipe or other means (not shown) for supplying makeup water to chimney 17, to provide the makeup water in case the cooling tower 12 is of the wet type.

As indicated earlier herein, there may be one or more nuclear chimneys, one additional chimney being shown and designated as 22 in the drawings. This second nuclear chimney 22 may be connected by pipe 23 to receive water from cooling unit 12 at the top of said chimney and a second pipe 24 connected to the bottom for delivering cooling water to reactor 11 in such a way that chimney 22 is connected in parallel with chimney 17. However, it will also be appreciated that this is not necessary and the chimneys may be connected in series or others may be connected in various series and parallel arrangements including chimneys which are coaxial in a vertical direction, e.g., one below the other. Moreover, various valving arrangements (not shown) may be used to connect one or more of the nuclear chimneys into the water flow path or out of the flow path according to the ability of the geological formation in which the chimneys are located to receive and dissipate heat from the water.

The concept of a contained underground nuclear detonation to create a reservoir for the purpose of utilizing groundwater as a nuclear power plant coolant is also disclosed in the embodiment shown in FIG. 2. In this case the detonation creates a large, highly permeable chimney 17' intersecting an aquifer 25'. The chimney functions as a large-diameter groundwater well and water is delivered therefrom by pipe means 16'. The groundwater replaces the water lost through evaporation in a cooling tower 12' which dissipates the plant's waste heat. Heated water is delivered to cooling unit 12' by pipe means 13' and cooled water including makeup water from chimney 17' is delivered to the reactor by pipe 21.

Appropriate explosive design and shielding would ensure a minimum initial level of radioactivity in the chimney. Any radioactivity entering the aquifer would be quickly diluted.

A specific example of a 200 kiloton nuclear detonation in tuff at a depth of 2,000 feet will now be described. Such a detonation creates a chimney with a radius of about 290 feet and a height of about 1,500 feet. Assuming a typical aquifer for the Western United States with a coefficient of permeability of $10^4$ gal/day ft$^2$, a saturated thickness of 100 feet and an effective hydrostatic head of 100 feet, the rate of water flow into the chimney is calculated to be $1.5 \times 10^5$ gal/min. Assuming a 1,000 MWe reactor with a cooling water circulation rate of $7 \times 10^5$ gal/min and 3 percent evaporation loss in the cooling tower, the calculated rate of water flow into the chimney is sufficient to ensure a steady-state condition.

The cost of a commercial nuclear detonation is anticipated to be about $1 million. The corresponding cost of the water storage capacity created by a 200 kiloton detonation is about $500 per acre-foot, comparable to the cost of a cooling pond.

The principal benefit of the concept is the elimination of the need to locate nuclear power plants near large bodies of surface water thereby increasing the number of potential sites. Eastern Nevada, for example, is a potential prime location for plants serving the Pacific Coast. Increased transmission costs from Nevada to the Pacific Coast could be offset by lower land acquisition costs. As a consequence of reduction in the potential earthquake hazard, design and construction costs for an Eastern Nevada plant should also be reduced. In addition, remote locations with low population densities would provide the opportunity to use much larger plants than are currently in use at a single site.

Another major benefit is the elimination of adverse surface water ecological effects such as thermal pollution and undesirable discharge and intake currents.

It may be desirable in the formation of the chimneys to flush same with water so as to remove some of the finer debris as well as nuclear or radiation contaminants. Obviously filter units, not shown, may be used where desired to remove physical pollutants or materials from the water path.

The invention is not to be limited to the exact form shown in the drawing for obviously many changes may be made, some of which are suggested herein, all within the scope of the following claims.

What is claimed is:

1. In a method of preventing thermal pollution of water resources from industrial facilities which require substantial cooling and wherein cooling water is circulated from said industrial facility to a cooling unit for removing substantial heat energy therefrom and back to said industrial facility for reuse, the improvement comprising,
   1. forming a large underground water reservoir by a nuclear explosion such that said reservoir has a greater vertical dimension than horizontal dimension,
   2. connecting the upper level of said underground reservoir to said cooling unit to receive water therefrom,
   3. connecting the lower end of said reservoir to said industrial facility to deliver cooled water therefrom,
   4. whereby excess heat energy remaining in the water issuing from said cooling unit is dissipated in the earth.
2. The invention claimed in claim 1 wherein said cooling unit is of the wet type,
   and the further step of deriving makeup water for water evaporation losses in said cooling unit by locating said reservoir below the level of a local aquifer.
3. The invention defined in claim 1 wherein said cooling unit is of the dry type.
4. In a large volume cooling water system for electric power generation, said system including a water flow path from the generator to a cooling unit and then a relatively large volume cooling-reservoir storage means, the improvement in said cooling-reservoir storage means comprising,
   said reservoir storage means being located completely below the earth surface and being of substantially greater depth than width, and constituted by at least one nuclear chimney located at least in part below the aquifer level thereat,
   means connecting the upper level of said reservoir to receive warm water from said cooling unit,
   means connected to the lower end of said reservoir for delivering cooler water therefrom to said generator unit.
5. The invention defined in claim 4 wherein said cooling unit is of the wet type and wherein said cooling-storage reservoir is located below the level of a local aquifer from which water flows to said reservoir to make up for water lost in said wet type cooling unit.
6. The invention defined in claim 5 wherein said underground reservoir includes at least a further nuclear chimney and passage means connecting said further nuclear chimney in a water flow circuit with each other and said generator.
7. The invention defined in claim 4 wherein said cooling unit is of the dry type and said water cooling system is of the closed-loop isolated type.
8. In a large volume cooling water system for electric power generation, said system including a water flow path from the generator to a wet type cooling unit and then back to said generator, the improvement comprising an underground, nuclear chimney water reservoir at least partly located below an aquifer and constituting a large diameter groundwater well, and pipe means for delivering water from said chimney to said cooling water system.
9. The invention defined in claim 8 wherein said chimney has a vertical length which is substantially greater than its diameter and is located to intersect said aquifer.

* * * * *